United States Patent [19]
Tuckey

[11] Patent Number: 5,960,775
[45] Date of Patent: Oct. 5, 1999

[54] FILTERED FUEL PUMP MODULE

[75] Inventor: Charles H. Tuckey, Cass City, Mich.

[73] Assignee: Walbro Corporation, Cass City, Mich.

[21] Appl. No.: 08/987,125

[22] Filed: Dec. 8, 1997

[51] Int. Cl.$^6$ ................................................. F02M 37/04
[52] U.S. Cl. .......................................... 123/509; 123/510
[58] Field of Search .................................... 123/509, 514, 123/516, 510; 137/574, 572, 576, 565, 113

[56] References Cited

U.S. PATENT DOCUMENTS

| | | | |
|---|---|---|---|
| 4,763,632 | 8/1988 | Andreasson | 123/510 |
| 4,974,570 | 12/1990 | Szwargulski et al. | 123/509 |
| 5,070,849 | 12/1991 | Rich | 123/514 |
| 5,139,000 | 8/1992 | Sawert | 123/514 |
| 5,363,827 | 11/1994 | Sikmann | 123/509 |
| 5,452,701 | 9/1995 | Tuckey | 123/509 |
| 5,680,847 | 10/1997 | Begley | 123/509 |
| 5,699,773 | 12/1997 | Kleppner | 123/509 |
| 5,718,208 | 2/1998 | Brautigan | 123/509 |
| 5,787,865 | 8/1998 | Harris | 123/516 |

*Primary Examiner*—Carl S. Miller
*Attorney, Agent, or Firm*—Reising, Ethington, Barnes, Kisselle, Learman & McCulloch, P.C.

[57] ABSTRACT

A fuel pump module disposed within a vehicle fuel tank has a fuel pump therein to draw fuel from the fuel tank and deliver that fuel under pressure to the vehicle engine, and a jet pump driven by the fuel pump to lower the pressure within the module to draw fuel from the fuel tank through a filtered inlet of the module when the fuel pump is operating. When the fuel pump is not operating, such as when the vehicle is not in use, the jet pump ceases to operate and the pressure within the module returns to that of the fuel tank. When the level of fuel in the fuel tank is lower than that within the fuel pump module and the pump is turned off, a portion of the fuel within the module returns to the fuel tank through the filtered inlet of the module thereby dislodging at least some of the contaminants trapped by the filter.

12 Claims, 2 Drawing Sheets

FILTERED FUEL PUMP MODULE

FIELD OF THE INVENTION

This invention relates generally to a vehicle engine fuel delivery system and more particularly to a fuel pump module constructed to be disposed within a vehicle fuel tank.

BACKGROUND OF THE INVENTION

Some fuel delivery systems utilize an electric fuel pump disposed within a vehicle fuel tank to draw fuel from the fuel tank and deliver that fuel under pressure to the vehicles engine. Contaminants within the fuel tank, such as weld slag or other residual materials from the manufacturing of the fuel tank as well as contaminants added to the tank during its use, can damage the fuel pump if allowed to enter therein and severely effect the durability and reliability of the fuel pump. To prevent at least the most harmful contaminants from entering the fuel pump, fuel filters of various materials have been disposed adjacent to the fuel pump inlet to trap these contaminants. These fuel filters are generally relatively small in size and located directly adjacent and attached to the fuel pump inlet.

In use, fuel flows in one direction through the fuel filter and the contaminants trapped by the filter clog the pores of the filter material and thereby reduce the fuel flow through the filter. The reduced fuel flow through the filter and into the fuel pump can damage the fuel pump as its strains to draw sufficient fuel through its inlet to supply a sufficient amount of fuel to the vehicle engine. In extreme cases, the fuel filter can become so clogged that insufficient fuel is delivered to the engine severely effecting the performance of the engine.

SUMMARY OF THE INVENTION

A fuel pump module disposed within a vehicle fuel tank has a fuel pump therein to draw fuel from the fuel tank and deliver that fuel under pressure to the vehicle engine, and a jet pump driven by the fuel pump to lower the pressure within the module to draw fuel from the fuel tank through a filter cartridge of the module when the fuel pump is operating. When the fuel pump is not operating, such as when the vehicle is not in use, the jet pump ceases to operate and the pressure within the module returns to that of the fuel tank. When the level of fuel in the fuel tank is lower than that within the fuel pump module, a portion of the fuel within the module returns to the fuel tank through the filter cartridge of the module thereby dislodging at least some of the contaminants trapped by the filter.

The jet pump is preferably disposed adjacent the fuel pump inlet in communication with a stand pipe which itself communicates with the upper most portion of the interior of the fuel pump module. The jet pump comprises a nozzle through which a portion of the fuel within the fuel pump is discharged and a reduced diameter orifice within the passage downstream of the nozzle through which fuel flows to create a drop in pressure adjacent the orifice. The drop in pressure is preferably communicated with the fuel pump inlet to draw fuel through the inlet and into the fuel pump. The drop in pressure in the passage also draws fuel vapor within the fuel pump module through the upper end of the stand pipe whereupon it is either drawn into the fuel pump or discharged through the downstream end of the stand pipe and into the fuel tank. The fuel pump inlet preferably has a check valve adjacent thereto to prevent fuel in the stand pipe from flowing out of the inlet when the fuel pump is not operating to maintain a supply of fuel adjacent to the fuel pump inlet. Thus, when the fuel pump is not operating and thus, the jet pump is also not operating and the fuel within the reservoir flows back into the main tank, a supply of fuel remains adjacent to the fuel pump inlet. This keeps the jet pump primed and enables the fuel pump to draw substantially all of the fuel from the fuel tank to permit operation of the vehicle engine even during extremely low level fuel conditions.

Objects, features and advantages of this invention include providing an improved fuel pump module that extends the useful life of the fuel filter, provides increased fuel filter surface area, improves filtration of the fuel, dislodges contaminants from the fuel filter in use, maintains a supply of fuel adjacent the fuel pump inlet even during extremely low fuel level conditions in the fuel tank, extends the service life of the fuel pump, removes hot fuel vapors from the fuel pump module, maintains an increased fuel level in the fuel pump module, is durable, reliable, of relatively simple design and economical manufacture and has a long useful life in-service.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENT

Figure 1:
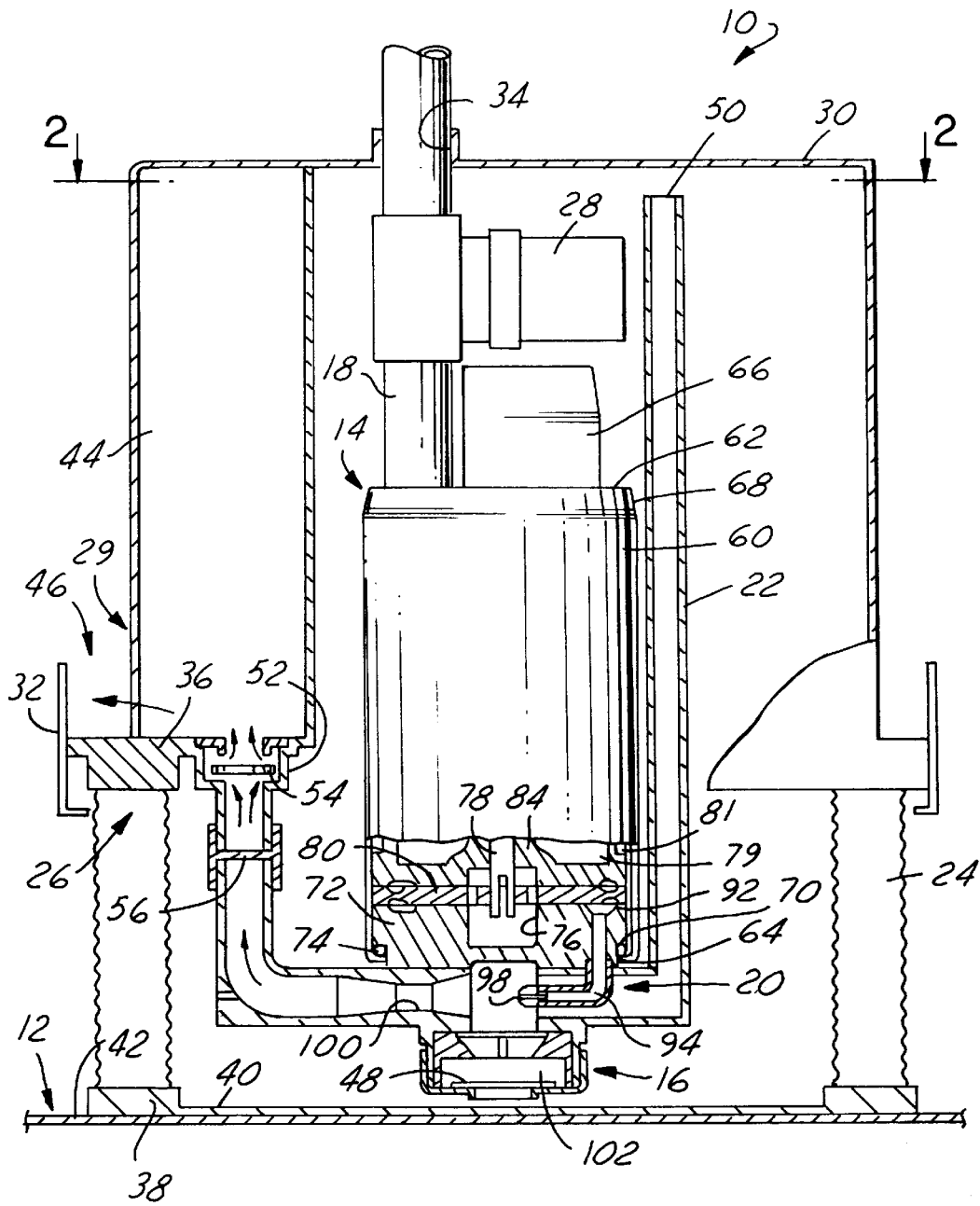
FIG. 1 is a full sectional view of a fuel pump module embodying this invention.
Figure 2:
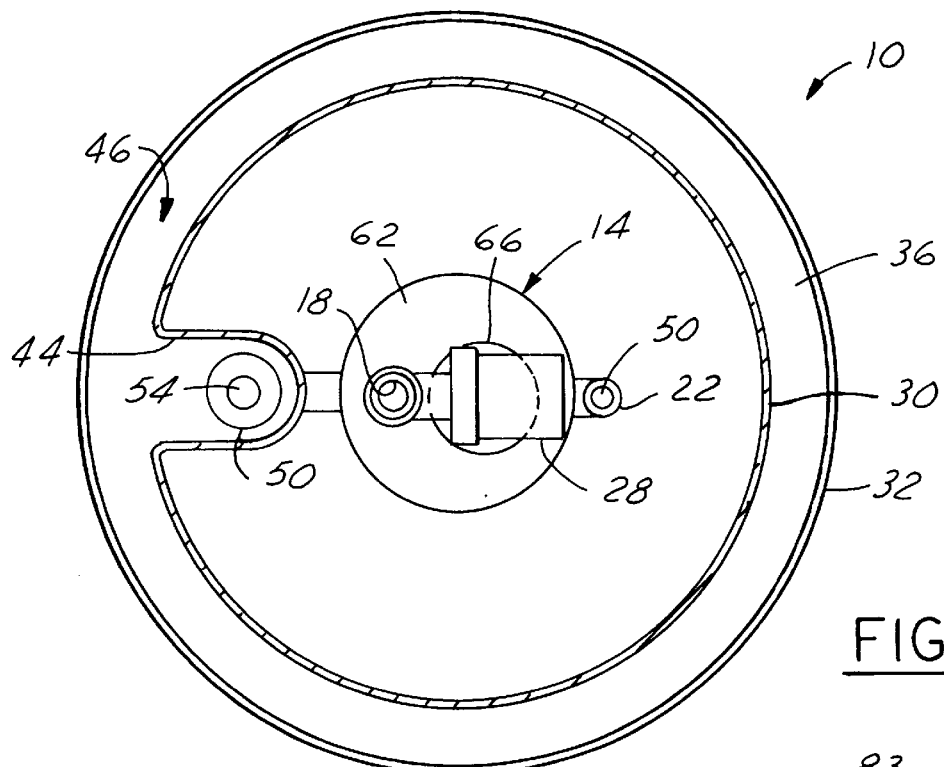
FIG. 2 is a sectional view of the fuel pump module taken generally on line 2—2 of FIG. 1.

Referring in more detail to the drawings, FIG. 1 shows a fuel pump module 10 disposed within a vehicle fuel tank 12 adjacent the bottom of the fuel tank 12. An electric motor fuel pump 14 is received in the module and has an inlet 16 disposed adjacent the bottom of the module 10 to draw fuel from the module 10 and an outlet 18 communicating with a fuel line to deliver fuel under pressure to the vehicle's engine. A jet pump 20 in communication with the fuel pump inlet 16 and received within a stand pipe 22 creates an increased pressure drop within the fuel pump module 10 to draw fuel into the module 10 through an annular filter 24 of a filter cartridge assembly 26 of the module 10 whereupon it may be drawn into the fuel pump 14 for delivery to the engine. A bypass regulator 28 preferably discharges excess fuel delivered from the outlet 18 of the fuel pump 14 into the module 10.

When the fuel pump 14 is not operating such as when the vehicle is not in use, and hence, the jet pump 20 is also not operating, the pressure within the fuel pump module 10 returns to that of the fuel tank 12. When the fuel level in the fuel tank 12 is below that within the module 10, some of the fuel within the module 10 flows back into the fuel tank 12 through the filter 24 thereby dislodging at least a portion of the contaminants trapped by the filter 24 to reduce clogging of the filter 24 and ensure a sufficient fuel flow through the filter 24 when the fuel pump 14 is operating.

The module 10 has a housing 29 which comprises an upper cap 30 secured to the annular filter cartridge 26 by a circumferential band 32. The fuel pump outlet 18 extends through an opening 34 through the cap 30 preferably with a slight interference fit providing a seal so that fuel cannot enter the module through the opening 34. The filter cartridge 26 comprises the annular filter 24 received between an upper ring 36 adjacent the cap 30 and an annular base 38 providing a generally flat lower wall 40 received adjacent the bottom wall 42 of the fuel tank 12.

The cap 30 has a recess 44 which communicates the stand pipe 22 with the fuel tank 12. The band 32 extend s slightly above the downstream end of the stand pipe 22 and with the cap 30 and ring 36 forms an annular reservoir 46 which with the recess retains a small amount of fuel. A check valve 48 adjacent the fuel pump inlet 16 prevents the fuel in the stand pipe 22, the recess 44 and reservoir 46 and the fuel pump 14 from flowing out of the fuel pump inlet 16 when the fuel pump 14 is not operating.

The upper end 50 of the stand pipe 22 preferably communicates with the interior of the module 10 generally adjacent to the upper most portion of the cap 30 and a downstream end 52 of the stand pipe 22 preferably communicates with the fuel tank 12 through the recess 44 to discharge fuel into the reservoir 46 and the fuel tank 12. A vent valve 54 is preferably disposed adjacent the downstream end 52 of the stand pipe 22 to permit fuel vapor in the stand pipe 22 to flow into the fuel tank 12. A filter 56 adjacent the downstream end 52 allows vapor to flow therethrough and filters any reverse flow from the tank 12 through the downstream end 52 of the stand pipe 22. Fuel vapor within the fuel pump module is drawn through the upper end 50 of the stand pipe 22 when the jet pump 20 is operating and is discharged through the downstream end 52 of the stand pipe 22 into the fuel tank 12, or a portion of the fuel vapor may be drawn into the fuel pump 14, to remove the fuel vapor from within the fuel pump module 10 and convert it to liquid fuel thereby reducing the quantity of fuel vapor in the system.

Figure 3:
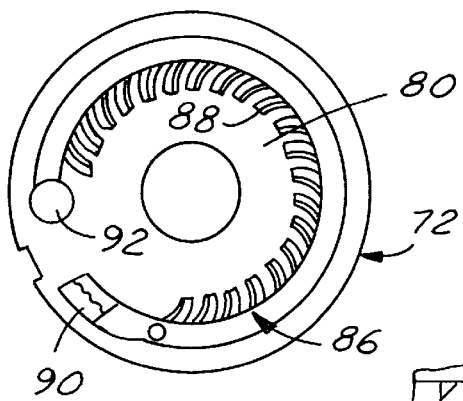
FIG. 3 is a sectional view illustrating a lower pump plate of a turbine element of the fuel pump.
Figure 4:
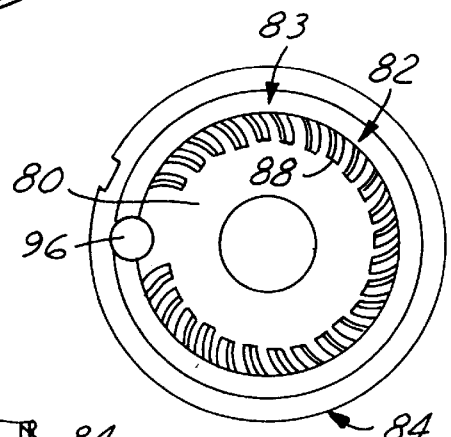
FIG. 4 is a sectional view of an upper pump plate of the fuel pump.
Figure 5:
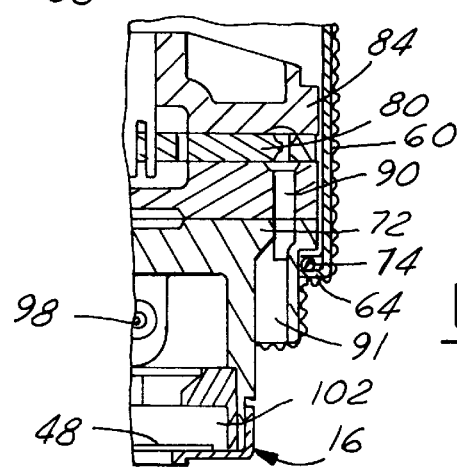
FIG. 5 is a partial sectional view of the fuel pump base and pumping elements.

The fuel pump 14 has a tubular outer shell 60 with a pair of open ends 62, 64 one of which 62 receives an outlet end cap 66 abutting an inwardly extending rim 68 to retain the outlet end cap 66 and the other end 64 receives and is rolled around a circular shoulder 70 formed in a pump base housing 72 with a seal 74 received between them to prevent leakage therethrough. The pump base housing 72 has a cylindrical recess 76 formed therein which partially receives an end of a shaft 78 of an armature 79 received in a stator 81 of the electric drive motor. A turbine element 80 is driven to rotate with its periphery moving in an annular pumping channel 82 (FIG. 4) formed on one side by an annular channel 83 in a top housing 84 and on the other side by an annular channel 86 (FIG. 3) on the top surface of the pump base housing 72. As shown in FIGS. 3 and 4, in each channel 83, 86, a circumferential array of generally radially oriented grooves 88 are formed extending radially inward respectively from the pumping channels 83, 86. An inlet port 90 is provided in the pump base housing 72 and a pump outlet port 92 in this base 72 opens to a side jet bypass passage 94. In the top housing 84 a main pump outlet passage 96 opens to the armature chamber and to the fuel pump outlet 18. The bypass passage 94 extends into the stand pipe 22 and leads to a jet nozzle 98 which discharges into a venturi 100 formed in the stand pipe 22. The check valve 48 is adjacent a pump fuel inlet chamber 102 and is constructed to admit fuel through the fuel inlet 16 of the jet pump 20 and prevent the reverse flow of fuel through the inlet 16.

Operation

In use, when the fuel pump 14 is energized, fuel is drawn from the fuel tank 12 through the annular filter 24 and through the inlet 90, 91 of the fuel pump 14 to supply fuel under pressure through the outlet 18 of the fuel pump 14 to the vehicle's engine. A portion of the fuel drawn into the fuel inlet 16 is supplied to the jet bypass passage 94 and is discharged through the jet nozzle 98 and associated venturi 100 downstream of the jet nozzle 98. The flow through the reduced diameter venturi 100 creates a drop in pressure adjacent to the venturi 100 which is communicated with the inlet 16 of the jet pump 20 and also with the interior of the module 10 via the upper end 50 of the stand pipe 22. The pressure drop in the module 10 draws fuel into the module 10 through the filter 24 and maintains an increased fuel level within the module 10 even during low fuel conditions in the fuel tank 12. The bypass regulator 28 discharges excess fuel into the module 10 which also supplies fuel to the interior of the module to maintain a supply of fuel adjacent to the inlets 16 and 90, 91. Vapor in the upper portion of the module 10 is drawn through the upper end 50 of the stand pipe 22 and is discharged through the downstream end 52 into the fuel tank 12 as described.

When the fuel pump 14 is not operating, and hence is not driving the jet pump 20, such as when the vehicle is not operating, the pressure within the module 10 equalizes with that of the fuel tank 12 and, when the level of fuel in the fuel tank 12 is lower than the level of fuel in the fuel pump module 10, a portion of the fuel in the module 10 will return to the fuel tank 12 through the filter 24 until the fuel levels of the module 10 and fuel tank 12 are equal. This reverse flow through the filter 24 has a washing effect tending to dislodge contaminants from the filter 24 and thereby greatly extending the life of the filter 24 by maintaining it in a relatively clean state. The check valve 48 prevents the fuel within the recess 44, reservoir 46, stand pipe 22 and jet pump 20 from flowing back through the inlet 16 thereby keeping the jet pump 20 primed and maintaining a limited supply of fuel at the inlet 16 even during extremely low fuel conditions within the fuel tank 12.

The two-step process of first, drawing fuel into the fuel pump module 10 and second, drawing fuel into the fuel pump 14, and the associated back flow of the fuel out of the fuel pump module 10 and into the fuel tank 12 when the fuel pump 14 is not operating resists excessive build-up of contaminants in the fuel filter 24 and thereby permits a substantially constant maximum fuel flow through the filter 24 throughout its service life. This provides sufficient fuel at the inlets 16 and 90, 91 of the fuel pump 14 which extends the life of the fuel pump 14 and allows the fuel pump 14 to supply sufficient fuel to the engine for its steady and consistent operation.

I claim:

1. A fuel pump module constructed to be disposed interiorly of a vehicle fuel tank comprising:

an electric motor fuel pump having an inlet and an outlet;

a housing enclosing the fuel pump and having at least one inlet through which fuel flows from the fuel tank into the housing;

a secondary pump with an inlet within the housing to lower the pressure within the housing below the pressure outside of the housing and within the fuel tank and an outlet to the exterior of the housing and within the tank; and at least one filter enclosing the inlet of the housing whereby the fuel pump draws fuel into the housing through the filter and the secondary pump creates a pressure drop within the housing lower than the pressure outside the housing and within the tank and increasing the fuel level therein when the fuel pump is operating and when the fuel pump ceases operating and the level of fuel in the tank is below the increased level of fuel in the housing, fuel in the housing returns to the tank through the filter, at least under certain fuel conditions, thereby dislodging at least some contaminants from the filter.

2. The fuel pump module of claim 1 wherein the housing comprises an upper cap received on an annular filter cartridge and the inlet of the housing is defined by the annular filter cartridge.

3. The fuel pump module of claim 1 which also comprises a stand pipe disposed in the module in communication with an upper portion of the interior of the fuel pump module at one end and with the fuel tank at its other end and communicated between its ends with the inlet and outlet of the secondary pump.

4. The fuel pump module of claim 3 wherein the secondary pump is a jet pump with a nozzle through which fuel is discharged to a reduced diameter orifice downstream of the nozzle creating a pressure drop adjacent the orifice and communicated with the interior of the fuel pump module through the stand pipe.

5. The fuel pump module of claim 4 wherein the jet pump is disposed adjacent the fuel pump inlet to draw fuel therethrough.

6. The fuel pump module of claim 1 also comprising a valve adjacent the fuel pump inlet and constructed to prevent the reverse flow of fuel from the fuel pump inlet.

7. The fuel pump module of claim 1 wherein the housing is generally cylindrical and the inlet of the housing is a plurality of circumferentially spaced openings each enclosed by a single filter.

8. The fuel pump module of claim 1 also comprising a passage generally adjacent the fuel pump outlet through which excess fuel delivered from the fuel pump is discharged into the module.

9. The fuel pump module of claim 1 wherein fuel vapor within the housing is communicated with the fuel tank through the outlet of the secondary pump.

10. The fuel pump module of claim 1 wherein the filter is annular and disposed surrounding the fuel pump module and covering each of its inlets.

11. The fuel pump module of claim 5 which also comprises a check valve adjacent the fuel pump inlet and constructed to prevent the reverse flow of fuel from the fuel pump inlet to maintain fuel in the stand pipe and within the fuel pump when the fuel pump is not operating.

12. A fuel pump module constructed to be disposed interiorly of a vehicle fuel tank comprising:

an electric motor fuel pump having an inlet and an outlet;

a housing enclosing the fuel pump and having at least one inlet through which fuel flows from the fuel tank into the housing;

a secondary pump within the housing to lower the pressure within the housing;

a stand pipe disposed in the housing in communication with an upper portion of the interior of the housing at one end and with the fuel tank at its other end and communicating between its ends with the secondary pump, the secondary pump being a jet pump with a fuel inlet and a nozzle through which fuel is discharged to a reduced diameter orifice downstream of the nozzle creating a pressure drop adjacent the orifice and communicated with the interior of the fuel pump module through the stand pipe, and the jet pump fuel inlet is disposed adjacent the fuel pump inlet to draw fuel therethrough;

a check valve adjacent the jet pump fuel inlet and constructed to prevent the reverse flow of fuel from the jet pump inlet to maintain fuel in the stand pipe and within the jet pump when the jet pump is not operating; and at least one filter enclosing the inlet of the housing whereby the fuel pump draws fuel into the housing through the filter and the secondary pump creates a pressure drop within the housing increasing the fuel level therein when the fuel pump is operating and when the fuel pump is not operating, fuel in the housing returns to the tank through the filter, at least under certain fuel conditions, thereby dislodging at least some contaminants from the filter.

* * * * *